United States Patent Office 3,662,068
Patented May 9, 1972

3,662,068
PROCESS AND COMPOSITION FOR BOTFLY
LARVAE ELIMINATION
Richard J. Mack, Overland Park, Kans., assignor to
Richardson-Merrell, Inc., New York, N.Y.
No Drawing. Filed June 11, 1970, Ser. No. 45,579
Int. Cl. A61k 27/00
U.S. Cl. 424—253
27 Claims

ABSTRACT OF THE DISCLOSURE

The use of choline xanthate to treat equine to eliminate botfly larvae from their gastrointestinal tract is improved by the concurrent use of an acidifying agent capable of releasing carbon disulfide from the choline xanthate upon reaction therewith. Novel coated and uncoated choline xanthate and acidifying substance mixtures are disclosed for this use.

---

This invention relates to compositions of matter and processes of using them for the elimination of the larvae of botflies from the gastrointestinal tract of equines.

Botflies and their larvae are important economic pests which are harmful to horses and other equines for most of the year in the United States. The seriousness of the botfly problem is indicated by the fact that botfly larvae are generally found in about 90% of horses examined. There are three principal species of botflies: the common botfly (*Gastrophilus intestinalis*), the nose botfly (*Gastrophilus haemorrhoidalis*), and the throat botfly (*Gastrophilus nasalis*). The females of these species annoy the animals by darting about laying eggs in the hair of the forelegs, their shoulder, the belly and other parts of the animal, or, in the case of the throat botfly, eggs may be laid on the hair under the jaws of the animal and the nose botfly deposits eggs at the lips or on the hair close to the skin of the upper and lower lips of the animal. These eggs hatch within various periods of time ranging from about two days up to two or three months. The animal licks or bites itself at the spot where the eggs have been attached, and the warmth of the animal's mouth stimulates hatching of larvae which are then taken into the animal's mouth when it licks or bites itself. The larvae burrow into the tongue, and after three or four weeks they pass into the animal's stomach or the forward end of the small intestine where they attach themselves and remain until they mature, which may require a total larval development period of ten to eleven months.

The damage caused by botflies and their larvae is both direct and indirect. The indirect damage might me caused by the animals defending themselves against the onslaught of the egg-laying females. The animals fear these flies and do what they can to get rid of them by bobbing their heads, rubbing their lips against surfaces such as their watering troughs, or against stones or other objects, and by running away. While the horses are fighting the flies they are unable to graze and may lose weight and suffer from malnutrition.

Direct damage to the animals is caused by the botfly larvae which attach themselves to the walls of the animal's stomach or intestine, where they cause inflammation which interferes with digestion, so that infected animals may suffer from colic or other gastric disturbances. The number of larvae infesting one horse may rise to over 1,000 in the case of a heavily infected animal.

Various treatments to prevent infestation of botfly larvae or to eliminate those that have already entered the gastrointestinal tract are available. Carbon disulfide, for instance, has been used for many years as a fumigant to remove the botfly larvae. This chemical causes the larvae to release their hold on the walls of the stomach and intestine and are thus removed. However, carbon disulfide must be administered by a stomach tube. The use of carbon disulfide, moreover, is disadvantageous in that it is relatively toxic, extremely flammable, irritating, and can produce severe inflammation of the pharyngeal and gastric mucosa. Accidental exposure of the animal and of the veterinarian attendant may result in respiratory distress and other toxic manifestations. Consequently, other drugs have been developed for dislodgment of the botfly larvae from the gastrointestinal tract of equine.

In a copending application of mine, choline xanthate has been shown to be effective for the removal of the larvae of botflies from the gastrointestinal tract of infested equine as well as preventing the larvae from attaching themselves to the mucous lining of their stomachs. At least one of the mechanisms involved in the therapeutic activity of choline xanthate is dependent upon the liberation of carbon disulfide by the action of naturally occurring acidic substances, found in the stomach of most warm-blooded animals, when the choline xanthate is administered. It has been found that the acidic nature of the equine stomach fluid will vary in its acidity from subject to subject and will be effected by the state of the digestive tract in terms of food and water present or not present and the degree of digestion of the ingesta. The presence of large numbers of bots, by the nature of their grasp upon the surface of the stomach and intestines, will inhibit or reduce the production of acidic substances by destruction of cells used in this normal digestive process, thus also altering the acidic nature of the animal stomach fluid.

Inasmuch as the effectiveness of choline xanthate depends, at least in part, upon dissociation of the compound with the release of carbon disulfide in the gastrointestinal tract, it is desirable that the stomach fluids of the animal have an acidic pH. Experiments have shown that while the hydrogen ion concentration of the stomach contents of the horse may be as low as 1.5 it may occasionally be over the point of neutrality, or above pH 7.0. In such instances, where the animal has an abnormal lack of gastric acidity, the action of choline xanthate may be less effective.

Accordingly, it has now been found that the variation in the natural acidity and the resultant variation in the reaction of stomach fluid with choline xanthate can be overcome by the administration of non-toxic acidifying substance prior to, at the same time as, or immediately after the administration of the choline xanthate. When an acidifying substance is administered concurrently with choline xanthate the removal of bots is more efficient than without the addition of such an acidifying substance. The therapeutic effect is also achieved in a significantly shorter period of time than when choline xanthate is administered without an acidifier. Another advantage is that the concurrent use of an acidifying substance with the choline xanthate is more effective in an unfasted animal than choline xanthate alone. This is a very desirable feature since fasting of animals prior to medicating them is inconvenient to the animal owner and places a further stress upon the animal.

Illustrative of the benefits to be obtained from the instant invention is the comparison of the results using choline xanthate alone with the results obtained when choline xanthate is employed with a suitable acid supply. For example, whereas about 132 milligrams of choline xanthate per kilogram of body weight is the optimum dose when the choline xanthate is employed alone, only about 66 grams of choline xanthate need be employed when employed with a suitable acidifying substance to obtain comparable or better results. Additionally, the 132 milligram per kilogram dose of choline xanthate alone removes 90 to 100% of the attached bots over a period of 24 hours whereas only a ½ to 3 hour period is required to obtain a 90 to 100% detachment of bots when 66 milligrams of choline xanthate per kilogram of body weight is employed along with a stoichiometrically equivalent quantity of an acidifying substance.

Bot larvae may be removed from the gastrointestinal tract of equine in accordance with the present invention by a single dose of choline xanthate and acidifying substance, preferably administered by means of a stomach tube, in amounts which range from about 20 to about 300 milligrams choline xanthate per kilogram of body weight, most preferably about 66 milligrams per kilogram, and about a stoichiometrically equivalent quantity of acidifying substance. An additional advantage of this invention is that the concurrent use of an acidifying substance is more effective in an unfasted animal than the use of choline xanthate alone. The use of a non-toxic acidifying agent provides for a higher safety index (therapeutic index) in that the effective dose of choline xanthate required can be substantially reduced.

Any suitable acidifying substance enhancing the activity of choline xanthate by supplying the hydrogen ion or acidity to react with choline xanthate may be employed in this invention to achieve the therapeutic effect desired. For example, monobasic, dibasic and tribasic mineral or organic acids may be employed. Illustrative of such acids there may be mentioned inorganic acids such as, for example, hydrochloric, sulfuric, phosphoric and related acids and organic carboxylic acids, such as, for example, fumaric, acetic, propionic, butyric, formic, citric, succinic, malonic, maleic, valeric, benzoic, phthalic and related acids, citric and tartaric acids and the like. Also, glutamic acid hydrochloride, betaine hydrochloride, Krebs cycle acids, chlorosulfonic acid, aryl sulfonic acids, ammonium chloride, calcium chloride, and acid salts of organic amines, such as, for example, piperazine hydrochloride, piperazine sulfate, piperazine phosphate, piperazine citrate, piperazine adipate, piperazine acetate and the like acidifying substance may be employed in this invention. Especially preferred, however, is glutamic acid hydrochloride because of its rather good solubility in aqueous media, its rapid rate of release of hydrogen ion, because it is an easily handled solid substance, and because of its known safety and medical use in achlorhydria. It is also possible to employ mixtures of such acidifying substances where desirable.

The quantity of acidifying substance employed will vary with the particular substance employed but will generally be used in about a substantially stoichiometrically equivalent quantity of the choline xanthate level being employed.

The choline xanthate and acidifying substance may be administered in the form of tablets, as a powder or granule in or on feed, as a paste or as a solid suspended in a non-reactive vehicle. Although the preferred route of administration is through the oral cavity or directly into the stomach by means of a catheter-type tube which is passed down the esophagus and into the stomach, topical ointments or creams may be used when it is desired to treat the external sites of infection on the body of the animal.

In preliminary experiments, stomachs from freshly killed horses were collected from an abattoir. The esophogeal and pyloric ends were ligated in a manner which would assure retention of the ingesta and contents of the stomach. The stomachs were placed in plastic bags and immersed in isotonic fluid which was maintained at body temperature. The esophogeal ligation was loosened and each stomach was infused with a predetermined quantity of choline xanthate and glutamic acid hydrochloride suspended in water. The stomachs were again immersed in the fluid which was maintained at body temperature. At timely intervals, observations were made of the action of the choline xanthate and glutamic acid hydrochloride. In summary, it was found that as little as 2 grams of choline xanthate and a stoichiometric equivalent of glutamic acid hydrochloride was effective in detaching bots from the lining of the stomach. In one case, a 15-gram dose of choline xanthate and a stoichiometric equivalent of glutamic acid hydrochloride resulted in detachment of 99.1% of the bots in the stomach in an elapsed time of 33 minutes; 100% in 43 minutes.

As stated previously, the non-toxic acidifying substance can be administered to the animal prior to, at the same time as, or immediately after the administration of the choline xanthate. Thus, for example, one can prepare a dispersible powder of choline xanthate and an acidifying substance for dispersing in an aqueous medium and subsequent administration to the animal. A more preferable form of the invention is a form wherein the choline xanthate and acidifying substance can be packaged in a single package with a suitable barrier between the two substances to prevent them from prematurely entering into a non-reversible chemical reaction. For example, one embodiment of this form of the invention resides in a composition of an acidifying substance mixed with coated choline xanthate pellets, granules, or spheres. Another form is that comprising a mixture of coated acidifying pellets, granules or spheres and choline xanthate. A preferred form of this invention is a composition wherein both the choline xanthate and the acidifying substance are coated with suitable coatings, to prevent premature reaction of the active ingredients, and thereby form a highly stable, odor-free and pharmaceutically acceptable product.

Also contemplated by this invention are tablets formed from the above-described compositions wherein either one or both of the active ingredients are in coated form.

The following examples are illustrative of the invention in which the parts are by weight unless otherwise specified. In the examples, the acidifying substance employed is fumaric acid, as exemplary, although it will be recognized that other suitable acidifying substances such as those named above could be employed.

EXAMPLE 1

One form of the choline xanthate suitable for therapeutic use in removing botfly larvae from equine is a water-dispersible powder. Such a water-dispersible powder is prepared, for example, by combining and mixing choline xanthate with a cold water-soluble suspending agent, preferably free of hydroxyl groups, and a hydrophilic water-soluble or dispersible suspending agent. Suitable suspending agents include granular microcrystalline cellulose and starch and suitable dispersing agents include polyoxyalkylene derivatives of hexitol anhydride partial long chain fatty acid esters, as well as sodium lauryl sulfate, sodium sulfosuccinate, ethylene oxide condensation products with propylene oxide-propylene glycol reaction products and represented empirically by $$HO(C_2H_4O)_x(C_3H_6)_y(C_2H_4O)_zH$$

and the like. Illustrative of such a water-dispersible powder formulation of the active compound there may be mentioned, for example, the following exemplary formulation:

| Formulation: | Parts |
|---|---|
| Choline xanthate | 78.0 |
| Pregelatinized starch | 20.0 |
| Polyoxyethylene sorbitan monolaurate | 2.0 |
| | 100.0 |

Twenty parts of pre-gelatinized starch was placed in a mixer and 2.0 parts of polyoxyethylene sorbitan monolaurate was added slowly with mixing, to avoid clumping, until a substantially homogeneous mixture was obtained followed by the addition of 78.0 parts of choline xanthate and mixing for a period of from about 15 minutes of 1 hour until a homogeneous mixture was obtained. The resulting powder is water dispersible.

Such a water-dispersible choline xanthate powder may be dissolved in an aqueous solution of a acidifying substance, such as, for example, in a fumaric acid solution, and the solution administered to equine in doses ranging from about 20 to about 300 mg. choline xanthate per kg. body weight. Administration of such a solution results in about a 90 to 100% detachment of bots occurring within 30 to 45 minutes and continuing for about 72 hours and beyond. The treatment may be repeated in 6–8 weeks, particularly if there is any danger that the animal may have become reinfected in the meantime.

EXAMPLE 2

Although choline xanthate and the selected acid may be administered in their natural state as crystalline powders, it has been found that for improvements in odor, palatability and stability as well as feasibility of packaging of the composition in a single container, it is preferred that the particles of each be coated with a protective coating. A most preferred form of this invention is that wherein choline xanthate granules are coated with an acid-soluble coating, such as, for example, an acrylic resin coating, and the acid is coated with a water-soluble coating, such as, for example, a cellulose coating. Such a composition has the advantage that the coated choline xanthate particles and acid particles may be packaged in a single container and be chemically stable over an extended period of time even while in substantially intimate contact.

Illustrative of such a coated product is that obtained using the following formulation:

Choline xanthate formulation

|  | Parts |
| --- | --- |
| Choline xanthate | 65.00 |
| Pre-gelatinized starch | 10.00 |
| Polyvinylpyrrolidone | 15.00 |
| Granular microcrystalline cellulose | 9.50 |
| Sodium lauryl sulfate | 0.47 |
| Silicone antifoam | 0.03 |
|  | 100.00 |

Choline xanthate coating material

|  | Parts |
| --- | --- |
| Acrylic resin (Eudragit E) | 12.5 |
| Acetone | 35.0 |
| Isopropyl alcohol | 52.5 |
|  | 100.0 |

Fumaric acid formulation

|  | Parts |
| --- | --- |
| Fumaric acid | 65.00 |
| Corn starch | 5.00 |
| Pre-gelatinized starch | 15.00 |
| Polyvinylpyrrolidone | 5.00 |
| Granular microcrystalline cellulose | 9.50 |
| Sodium lauryl sulfate | 0.47 |
| Silicone antifoam | 0.03 |
|  | 100.00 |

Fumaric acid coating material

|  | Parts |
| --- | --- |
| Coloring agent | 3.97 |
| Methylcellulose | 1.96 |
| Ethylcellulose | 0.49 |
| Diethyl phthalate | 0.28 |
| Methanol | 35.46 |
| Methylene chloride | 57.84 |
|  | 100.00 |

To prepare the coated choline xanthate spheres, 9.50 parts of granular microcrystalline cellulose was placed in a suitable mixer, such as a Hobart Z-bar twin shell mixer, and 0.03 part of a silicone antifoam added slowly and mixed for about 15 minutes followed by the addition of 65.0 parts choline xanthate, 10.0 parts pre-gelatinized starch, 15.0 parts polyvinylpyrrolidone and 0.47 part sodium lauryl sulfate with mixing for about 15 to 30 minutes. Deionized water was slowly added to bring the mixture to the desired consistency wherein the mixed materials are just starting to cling together. The resulting mass was passed through a Model EXDCS–100 twin extruder with a 3 mm. screen to produce strands of material. To a model Q–400 Marumerizer spheronizing machine running at between about 800 and 1400 r.p.m. was added a maximum load of the extruded material and the extruded material was rolled for a period of from 15 to 120 seconds, as required, to form spheres of the material. The spheres of the material formed were of substantially uniform diameter of approximately 0.5 to 15 mm., preferably 1.75 mm., and were discharged onto a drying tray where the spheres were dried at 110° F. for a period of from 8 to 16 hours.

The dried choline xanthate spheres were then spray coated with a solution comprised of 12.5 parts of a Eudragit E copolymer synthesized from dimethylaminoethyl methacrylate and butyl methacrylate, 35.0 parts acetone and 52.5 parts isopropyl alcohol. After coating the choline xanthate spheres with sufficient coating solution to provide about 12.5% Eudragit E in the final product, the coated spheres were dried for a period of from 8 to 16 hours in the absence of additional heat.

In a similar manner, in order to prepare coated fumaric acid spheres, 9.50 parts of granular microcrystalline cellulose was placed in a suitable mixer, such as a Hobart, Z-bar, twin shell mixer, and 0.03 part of silicone antifoam added slowly and mixed for about 15 minutes followed by the addition of 65.0 parts fumaric acid, 5.0 parts corn starch, 15.0 parts pre-gelatinized starch, 5.0 parts polyvinylpyrrolidone, and 0.47 part sodium lauryl sulfate with mixing for about 15 to 30 minutes. Deionized water was slowly added to bring the mixture to the desired consistency wherein the mixed materials are just starting to cling together. The resulting mass was passed through a Model EXDCS–100 twin extruder with a 3 mm. screen to produce strands of material. To a Model Q–400 Marumerizer spheronizing machine running at between 800 and 1400 r.p.m. was added a maximum load of the extruded material and the extruded material was rolled for a period of from 15 to 120 seconds, as required, to form spheres of the material. The spheres of the material formed were of substantially uniform diameter of approximately 0.5 to 15 mm., preferably 1.75 mm., and were discharged onto a drying tray where the spheres were dried at 110° F. for a period of from 8 to 16 hours.

The dried fumaric acid spheres were then spray coated with a solution comprised of 3.97 parts coloring agent, 1.96 parts methylcellulose, 0.49 part ethylcellulose, 0.28 part diethyl phthalate, 35.46 parts methanol and 57.84 parts methylene chloride. After coating the fumaric acid spheres with sufficient coating solution to provide about 6.0% by weight of the coating in the final coated spheres, the coated spheres were spray dried for a period of from 8 to 16 hours in the absence of additional heat.

The coated choline xanthate spheres and the coated fumaric acid spheres thus produced are suitable for placing in a suitable container, such as, for example, a glass bottle, a gelatin capsule, a polyethylene bag or the like, in intimate and homogeneous admixture, from where the composition can be easily and readily dispersed into a mixing tank containing water to provide a therapeutically effective solution suitable for administration to equine in dosage to provide from about 20 to 300 milligrams choline xanthate and a stoichiometrically equivalent amount of fumaric acid, per kilogram of body weight. Dispersing the composition in a mixing tank containing water results in a homogeneous suspension of the active ingredients which remains in suspension for at least one-half hour. The stable suspension results from the fact that upon placing the mixed spheroidal composition in water, the water-soluble coating on the fumaric acid spheres dissolves and fumaric acid is released increasing acidity of the solution to approximately pH 2–5 whereupon the acid-soluble coating on the choline xanthate spheres is dissolved and choline xanthate is released to form the therapeutically active suspension.

EXAMPLE 3

A similar embodiment of this invention is that wherein choline xanthate granules are coated with a water-soluble coating, such as, for example, a cellulose coating, and the acid is coated with a basic-soluble coating, such as, for example, a basic-soluble acrylic coating, for example, Eudragit L, Eudragit S or mixtures thereof. Eudragit L and S are copolymers of methylmethacrylate and methacrylic acid. Such a composition has the advantage that the coated choline xanthate particles and acid particles may be packaged in a single container and be chemically stable over an extended period of time even while in substantially intimate contact.

Illustrative of such a coated product is that obtained using the following formulation.

Choline xanthate formulation

| | Parts |
|---|---|
| Choline xanthate | 65.00 |
| Pre-gelatinized starch | 10.00 |
| Polyvinylpyrrolidone | 15.00 |
| Granular microcrystalline cellulose | 9.50 |
| Sodium lauryl sulfate | 0.47 |
| Silicone antifoam | 0.03 |
| | 100.00 |

Choline xanthate coating material

| | Parts |
|---|---|
| Coloring agent | 3.97 |
| Methylcellulose | 1.96 |
| Ethylcellulose | 0.49 |
| Diethyl phthalate | 0.28 |
| Methanol | 35.46 |
| Methylene chloride | 57.84 |
| | 100.00 |

Glutamic acid hydrochloride formulation

| | Parts |
|---|---|
| Glutamic acid hydrochloride | 65.00 |
| Corn starch | 5.00 |
| Pre-gelatinized starch | 15.00 |
| Polyvinyl pyrrolidone | 5.00 |
| Granular microcrystalline cellulose | 9.50 |
| Sodium lauryl sulfate | 0.47 |
| Silicone antifoam | 0.03 |
| | 100.00 |

Glutamic acid hydrochloride coating material

| | Parts |
|---|---|
| Acrylic resin (Eudragit L) | 12.5 |
| Acetone | 35.0 |
| Isopropyl alcohol | 52.5 |
| | 100.00 |

The coated choline xanthate and glutamic acid hydrochloride spheres are prepared in a manner identical to that described in Example 2 from the above stated formulation.

EXAMPLE 4

A further embodiment of this invention is that wherein the composition is in the form of a tablet. Although tablets may be prepared from either coated or uncoated choline xanthate and fumaric acid, it is preferred that tablets be prepared from the coated spheres prepared as in Example 2 using the following exemplary formulation:

Formulation:

| | Parts |
|---|---|
| Coated choline xanthate spheres | 27.00 |
| Coated fumaric acid spheres | 14.00 |
| Corn starch | 20.00 |
| Granular microcrystalline cellulose | 15.00 |
| Sodium lauryl sulfate | 0.25 |
| Pre-gelatinized starch | 20.00 |
| Pyrogenic silica | 1.75 |
| Magnesium stearate | 2.00 |
| | 100.00 |

All the ingredients were mixed in a twin shell mixer for about 50 minutes and the resulting mixture compressed into tablets weighing about 122 grams each using the lowest pressure possible to form an acceptable tablet. Such tablets form therapeutically effective solution by dissolving in water in less than 5 minutes.

In a similar manner tablets can be prepared using coated choline xanthate with uncoated fumaric acid or by using uncoated choline xanthate with coated fumaric acid spheres.

What is claimed is:

1. A process for treating equine for the elimination of botfly larvae from the gastrointestinal tract of equine which comprises orally administering an effective quantity of choline xanthate and an acidifying substance capable of releasing carbon disulfide from the choline xanthate upon reaction therewith.

2. The process of claim 1 wherein the choline xanthate and acidifying substance are administered concurrently.

3. The process of claim 1 wherein the effective quantity of choline xanthate employed is a therapeutically effective quantity of from about 20 to 300 milligrams per kilogram of equine body weight and the acidifying substance is employed in approximately a stoichiometrically equivalent amount based on the amount of choline xanthate.

4. The process of claim 2 wherein the choline xanthate and acidifying substance are administered concurrently as a water dispersed solution.

5. The process of claim 4 wherein the administration is an administration by means of a stomach tube.

6. The process of claim 3 wherein the acidifying substance employed is fumaric acid or glutamic acid hydrochloride.

7. The process of claim 4 wherein the acidifying substance employed is fumaric acid or glutamic acid hydrochloride.

8. The process of claim 5 wherein the acidifying substance employed is fumaric acid or glutamic acid hydrochloride.

9. The process of claim 3 wherein the acidifying substance employed is a non-toxic mineral or organic acid.

10. The process of claim 3 wherein the choline xanthate and acidifying substance are employed in the form of particles in spheroidal form of substantially uniform diameter of from about 0.5 to 15 mm. and wherein the choline xanthate particles are coated with an acid-soluble coating and the acidifying particles are coated with a water-soluble coating.

11. The process of claim 10 wherein the choline xanthate particles are coated with an acrylic resin coating of a copolymer of butylmethacrylate and dimethylaminoethyl methacrylate and the acidifying substance is coated with a cellulose coating.

12. The process of claim 11 wherein the acidifying substance is fumaric acid.

13. The process of claim 3 wherein the choline xanthate and acidifying substance are employed in the form of a tablet formed from choline xanthate and an acidifying substance wherein at least one of these two components in the tablet is utilized in a coated state and with the proviso that if the choline xanthate is coated it is coated with an acid-soluble coating and if the acidifying substance is coated it is coated with a water-soluble coating.

14. The process of claim 13 wherein the acidifying substance is fumaric acid, the choline xanthate is coated with an acrylic resin coating of a copolymer of butylmethacrylate and dimethylaminoethyl methacrylate and the fumaric acid is coated with a cellulose coating.

15. The process of claim 3 wherein the choline xanthate and acidifying substance are employed in the form of particles in spheroidal form of substantially uniform diameter of from about 0.5 to 15 mm. and wherein the choline xanthate particles are coated with a water-soluble coating and the acidifying particles are coated with a basic-soluble coating.

16. The process of claim 15 wherein the choline xanthate particles are coated with a cellulose coating and the acidifying particles are glutamic acid hydrochloride particles coated with a copolymer of methylmethacrylate and methacrylic acid.

17. A composition of matter for treating equine to eliminate botfly larvae infestation in the gastrointestinal tract of equine comprising an effective quantity of choline xanthate and a substantially stoichiometrically equivalent amount of an acidifying substance capable of releasing carbon disulfide from the choline xanthate upon reaction therewith.

18. The composition of claim 17 wherein the acidifying substance is fumaric acid or glutamic acid hydrochloride.

19. The composition of claim 17 which is a water-dispersible powder.

20. The composition of claim 19 wherein the acidifying substance is fumaric acid.

21. The composition of claim 17 wherein the composition is a substantially homogeneous mixture of chloine xanthate and acidifying particles in the form of spheroids of substantially uniform diameter of about 0.5 to 15 mm. and wherein the choline xanthate particles are coated with an acid-soluble coating and the acidifying particles are coated with a water-soluble coating.

22. The composition of claim 21 wherein the choline xanthate particles are coated with an acrylic resin coating of a copolymer of butylmethacrylate and dimethylaminoethyl methacrylate and the acidifying substance is coated with a cellulose coating.

23. The composition of claim 22 wherein the acidifying substance is fumaric acid.

24. The composition of claim 17 wherein the choline xanthate and acidifying substance are in the form of a tablet formed from choline xanthate and an acidifying substance wherein at least one of these two components in the tablet is utilized in a coated state and with the proviso that if the choline xanthate is coated it is coated with an acid-soluble coating and if the acidifying substance is coated it is coated with a water-soluble coating.

25. The composition of claim 24 wherein the acidifying substance is fumaric acid, the choline xanthate is coated with an acrylic resin coating of a copolymer of butylmethacrylate and dimethylaminoethyl methacrylate and the fumaric acid is coated with a cellulose coating.

26. The composition of claim 17 wherein the composition is a substantially homogeneous mixture of choline xanthate and acidifying particles in the form of spheroids of substantially uniform diameter of about 0.5 to 15 mm. and wherein the choline xanthate particles are coated with a water-soluble coating and the acidifying particles are coated with a basic-soluble coating.

27. The composition of claim 26 wherein choline xanthate particles are coated with a cellulose coating and the acidifying particles are glutamic acid hydrochloride particles coated with a copolymer of methylmethacrylate and methacrylic acid.

References Cited
UNITED STATES PATENTS 2,972,613    2/1961    Freed _____ 424—246

SAM ROSEN, Primary Examiner